A. B. BROWN.
ATTACHING HUBS TO AXLES.
No. 173,206. Patented Feb. 8, 1876.
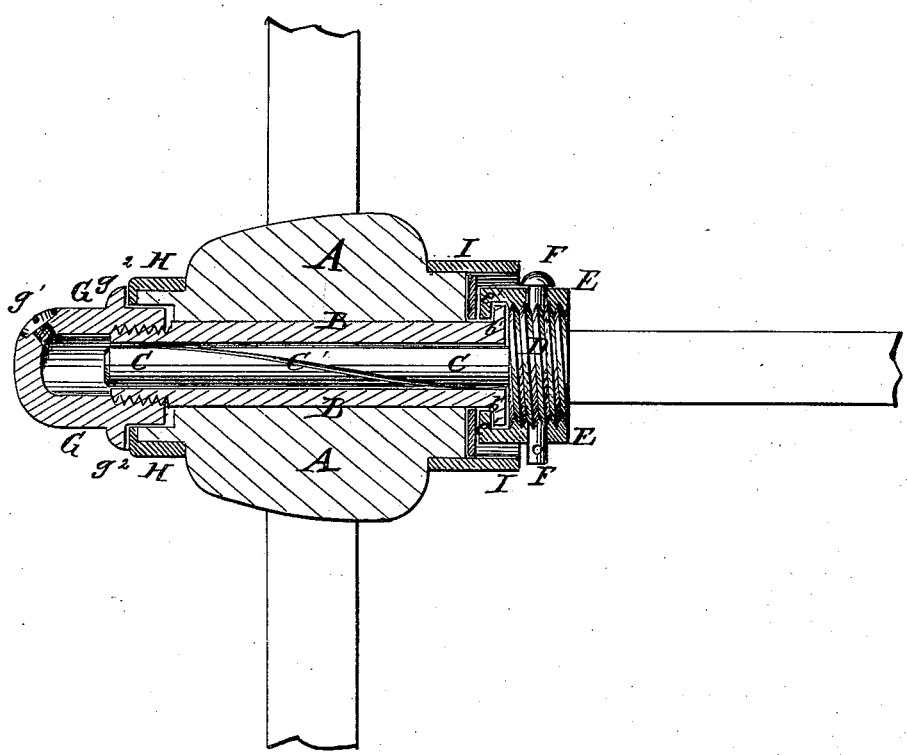
WITNESSES:
INVENTOR:
Alden B. Brown
BY
ATTORNEYS.

UNITED STATES PATENT OFFICE.

ALDEN B. BROWN, OF COMSTOCK, MICHIGAN.

IMPROVEMENT IN ATTACHING HUBS TO AXLES.

Specification forming part of Letters Patent No. 173,206, dated February 8, 1876; application filed July 3, 1875.

*To all whom it may concern:*

Be it known that I, ALDEN B. BROWN, of Comstock, in the county of Kalamazoo and State of Michigan, have invented a new and useful Improvement in Axle-Box, of which the following is a specification:

The figure is a longitudinal section of my improved axle-box, and the hub to which it is applied, the axle-arm being shown in side view.

The invention relates to the construction and arrangement of parts for securing the wheel-box on the axle-arm on said box, as hereinafter described.

A is the hub of the wheel. B is the axle-box, which is fitted into the bore of the hub A, and which is made longer than the said hub A, so as to project at both ends. C is the axle-arm, which fits into the axle-box B, and has a collar, D, formed upon its inner end. Upon the inner end of the axle-box B is formed an outwardly-projecting ring-flange, $b'$, which rests against the collar D, and interlocks with an inwardly-projecting ring-flange, $e'$, formed upon the inner end of the sleeve or band E.

When the band E is to be applied to an old axle, the pin F may be employed to fasten it and the screw-thread dispensed with.

Upon the outer surface of the projecting outer end of the axle-box B is cut a screw-thread, into which fits a screw-thread formed upon the inner surface of the cap-nut G. The cap-nut G projects outward, and has a recess formed in it to serve as a reservoir for the oil, and has a hole formed through it, leading into its cavity, through which the oil may be poured, and which is closed by a screw or other plug, $g^1$. The nut G has a ring-flange, $g^2$, formed around it, which rests against the outer hub-band H. The inner hub-band I projects over a part of the band E, as shown in the figure. In the axle-arm C is formed a spiral groove, $c'$, to conduct the oil from the reservoir in the nut G along the entire length of the axle-arm C.

By this construction the oil cannot get out, and dirt and sand cannot get in to wear the axle-arm C and the axle-box B.

Having thus described my invention, I claim as new and desire to secure by Letters Patent—

The combination of the threaded band E with the axle-box B, having corresponding and interlocking ring-flanges $b'$ $e'$, and the axle having enlarged threaded collar D, as shown and described, for the purpose specified.

ALDEN B. BROWN.

Witnesses:
 JAMES W. HOPKINS,
 HAMPDEN KELSEY.